April 28, 1964  R. J. HUSBAND  3,131,334
TIMED-CYCLE CONTROL
Filed Oct. 10, 1961

INVENTOR.
REED J. HUSBAND
BY Angus & Mon
ATTORNEYS.

United States Patent Office 3,131,334
Patented Apr. 28, 1964

3,131,334
TIMED-CYCLE CONTROL
Reed J. Husband, 650 Carroll Way, Pasadena, Calif.
Filed Oct. 10, 1961, Ser. No. 144,082
9 Claims. (Cl. 317—141)

This invention relates to a control circuit for controlling and timing the application of power to a device such as an electric motor or a relay controlling a motor.

There are many installations such as for toilets on buses, trains and aircraft, where it is desired to run a motor driven pump for a given period of time to accomplish a flushing cycle. It is desirable that the control circuit be started by a momentary push on a starter switch, which will start a cycle of invariable period, the starter switch being thereafter ineffective until the cycle has been completed. This invention achieves these objectives in circuits which are built up of a minimum number of simple and easily serviced components.

A control circuit according to this invention has an input terminal, output terminal and a ground terminal. There are included a pair of delay means which operate sequentially, each for a period of time determined by its own characteristics, and which respectively control the sequential operation of a pair of relay means, which relay means are effective to control the application of power to the output terminal. One of the relay means includes a lockout provision which disables the first stage relay means so that a user's closing the starting switch during a cycle of operation is without effect on the period of the cycle in operation and is ineffective to start another cycle until a previous cycle is completed.

According to a preferred but optional feature of the invention, the delay means comprise thermal relays, which are inexpensive and effective means for timing sequential action.

Figure 1:
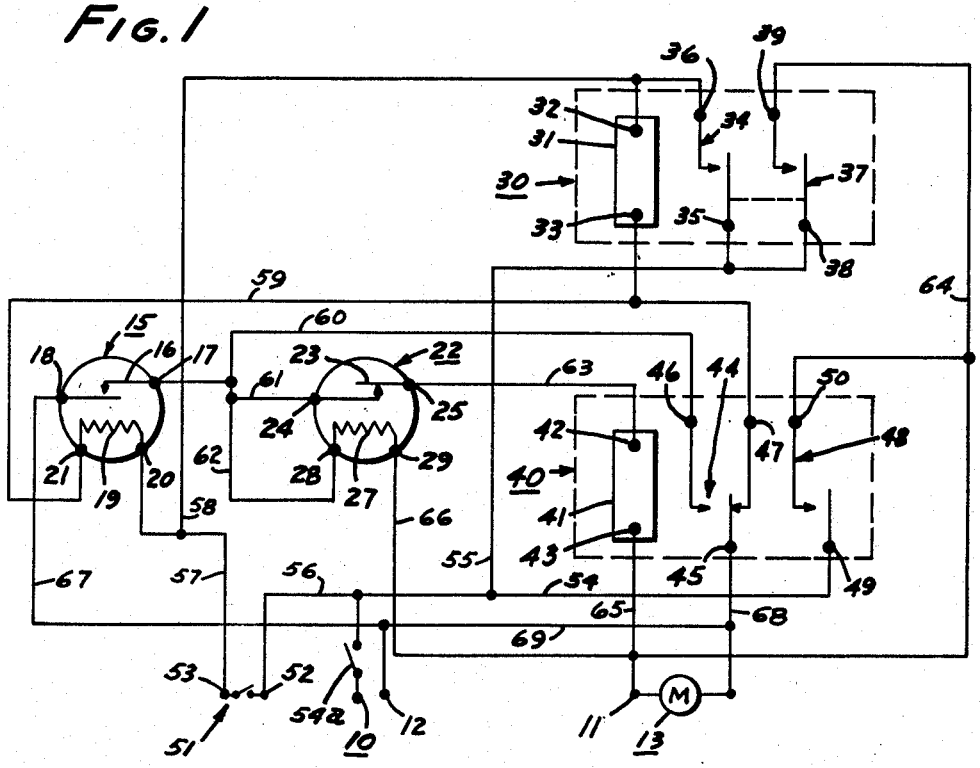
Figure 2:
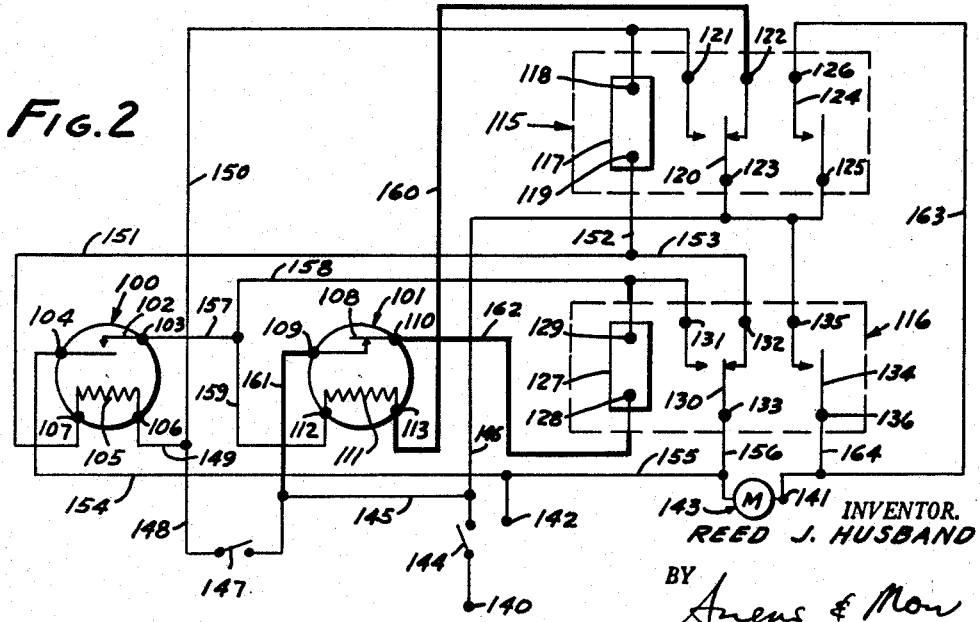

The above and other features of this invention will be fully understood from the following detailed description and the accompanying drawing in which FIGS. 1 and 2 are circuit diagrams of circuits according to this invention, FIG. 2 showing the presently preferred embodiment.

The object of the invention is to control application of power from an input terminal 10 to an output terminal 11. There is a return or ground terminal 12 which may be, but is not necessarily, a common ground for use of both the input and output circuits. It will be understood that the term "ground" is used in a broad sense, and means the return portion of a circuit. It may be a frame connection if desired. Also, although circuits using direct current throughout are shown here, it is evident that either circuit is adaptable for use with only alternating current throughout with only obvious modification. It can also be used to control A.C. current for the motor with D.C. control supply, or vice versa. Control of large motor currents can be assisted by the addition of one or more additional power control switches or relays ganged to the relay means shown herein. Single or multi-phase current for powering a motor may be controlled by the addition of a suitable number of additional power control switches, leaving the remainder of the circuit as shown, and operating on D.C. or being modified by providing relays effective for switching purposes with A.C. current. All of these modifications are within the scope of the invention. A motor 13 is shown connected across the output and ground terminals, which is operable by current supplied from the input. It is the object of the control circuit in the drawings to control the period of time during which this power is supplied. It will be recognized that, instead of a motor, some other type of device could be operated by this power. For example, operation of a solenoid-actuated switch for controlling the application of even greater power to a motor could be controlled. The type of device whose operation is being controlled (the motor in the circuits illustrated), forms no part of the invention.

The circuit includes a first delay means 15 which in the presently preferred embodiment of the invention is a thermal relay tube. This tube includes a switch 16, having first and second terminals 17, 18, and a switch-actuating means 19 which ordinarily is a heater coil having first and second terminals 20, 21. The switch has two switching conditions, the normally open position which is assumed when the tube is cold is illustrated in the drawings. The closed condition of the switch is assumed when the switch-actuating means have put out enough heat to actuate the switch. The function of the thermal relay tube is to change the switching condition to the actuating condition after a given temperature has been reached in the switch-actuating means, and is a function of the current passed therethrough, and the time the current has been passed.

A second delay means 22 is similar to first delay means 15 and includes a switch 23, having first and second terminals 24, 25, and switch-actuating means 27, having first and second terminals 28, 29. However, in contrast to switch 16, switch 23 is normally closed as illustrated. It is open when actuated by its respective switch-actuating means.

Suitable thermal relay tubes for means 15 and 22 application are Amperite Thermostatic Delay Relays, Catalog Nos. 26N08T and 26C8T, respectively. These particular relays are adapted to operate on 25-volt current and have an eight-second cycle, that is, their switching condition will change from the non-actuated, "normal" condition to the actuated condition after current at that voltage has been "on" in the switch actuating means for eight seconds. It will be understood that should it be desired to change the overall cycle of the control circuit, it is only necessary to substitute for one or both of these relays, relays with the same function but different delay periods. These are readily available on the market. Another source of delay means 15 and 22 is from G. V. Controls, Inc., of Livingston, New Jersey, Catalog Nos. DT7025 and DT7026, respectively.

A first relay means 30 includes a coil 31 having first and second terminals 32, 33. This coil controls the operation of captive circuit switch 34 having first and second terminals 35, 36, and a power control switch 37 having first and second terminals 38, 39. Switches 34 and 37 are ganged together and are shown in their unactuated, normally open condition which exists when no voltage is applied to the coil. When the coil is energized by application of voltage, the switches are changed to their actuated condition in which they are closed.

A second relay means 40 includes a coil 41 having first and second terminals 42, 43. The coil controls the switching condition of a pair of switches. A captive circuit switch 44 has a common terminal 45, a captive circuit terminal 46, and a lockout terminal 47. A power control switch 48 has first and second terminals 49, 50. These switches are shown in their unactuated, normal condition which exists when voltage is not applied across the coil. In this condition, the captive circuit switch interconnects the common and lockout terminals, and normally open power control switch 48 is open. In the actuated condition, when sufficient voltage is placed across coil 41 to switch over the ganged switches 44 and 48, switch 44 interconnects its common terminal and captive circuit terminal, and switch 48 is closed.

A starter switch 51 has first and second terminals 52, 53, and is normally open. It is adapted to be momentarily closed by a person wishing to start the cycle of operation of motor 13.

Input terminal 10 is connected by lead 54 and a master switch 54a to first terminal 49 of switch 48, by lead 55 to first terminals 35 and 38 in relay 30, and by lead 56 to first terminal 52 of the starter switch.

Second terminal 53 of the starter switch is connected by lead 57 to first terminal 20 of switch-actuating means 19 in the first delay means and by lead 58, which is a continuation of lead 57, to first terminal 32 of coil 31 in the first relay means, and to second terminal 36 of captive relay switch 34 in the first relay means.

Second terminal 21 of switch-actuating means 29 in the first delay means is connected by lead 59 to second terminal 33 of coil 31 in the first relay means, and to lockout terminal 47 in captive circuit switch 44 of the second relay means. First terminal 17 of switch 16 in the first delay means is connected by lead 60 to captive circuit terminal 46 of captive circuit switch 44 in the second relay means. It is further connected by lead 61 to first terminal 24 of switch 23 in the second delay means, and by lead 62 to first terminal 28 in switch-actuating means 27 of the second delay means.

Second terminal 25 of switch 23 in the second delay means is connected by lead 63 to first terminal 42 of coil 41 in the second relay means.

Second terminal 39 of power control switch 37 in the first relay, and second terminal 50 of power control switch 48 in the second relay means are both connected by lead 64 to output terminal 11. Second terminal 43 of coil 41 in the second relay means is connected by lead 65 to lead 64 and thus to the output terminal. Second terminal 29 of switch-actuating means 27 in the second delay means is connected by lead 66 to output terminal 11.

Second terminal 18 of switch 16 in the first delay means is connected by lead 67 to ground terminal 12. Common terminal 45 of captive switch 54 in the second relay means is connected by leads 68 and 69 to ground terminal 12.

Motor 13 is connected across output terminal 11 and ground terminal 12. The connection to the ground terminal is via lead 69.

FIG. 2 illustrates a variation of the circuit of FIG. 1, which, while it uses an extra switch terminal in one relay, does avoid certain of the problems which occasionally arise in the circuit of FIG. 1. The circuit of FIG. 2 includes first and second delay means 100, 101, which are respectively identical to first and second delay means 15 and 22 of FIG. 1.

Delay means 100 includes a switch 102 having first and second terminals 103, 104 and a first switch-actuating means 105 having first and second terminals 106, 107.

Delay means 101 includes a switch 108 having first and second terminals 109, 110. It also includes second switch-actuating means 111, which has first and second terminals 112, 113.

The circuit also includes first and second relay means 115, 116, both of which are identical to relay means 40 in FIG. 1 and which are identical to each other. Relay means 115 includes a coil 117 having first and second terminals 118, 119. It has a captive circuit switch 120 with a captive circuit terminal 121, a lockout terminal 122 and a common terminal 123. It also includes a power control switch 124 having first and second terminals 125, 126.

Relay means 116 includes a coil 127 having first and second terminals 128, 129. It has a captive circuit switch 130 with a captive circuit terminal 131, a lockout terminal 132 and a common terminal 133. A power control switch 134 has first and second terminals 135, 136.

The circuit has an input terminal 140, an output terminal 141, and a return or ground terminal 142, which correspond in their function and adaptability to various A.C., D.C., or combinations thereof, to terminals 10, 11 and 12 of FIG. 1. Their purpose is to enable power to be applied to a motor 143 or other element under the control of this circuit.

The circuits of FIGS. 1 and 2 are generally similar. Their principal dissimilarities of circuitry are emphasized by heavier lines in FIG. 2.

A master switch 144 is connected to the input terminal and to leads 145, 146. A starter switch 147 is connected between lead 145 and lead 148. Lead 148 is in turn connected by lead 149 to first terminal 106 of switch-actuating means 105. Lead 150 connects lead 148 to first terminal 118 of coil 117 and to the captive circuit terminal 121 of switch 120.

Lead 151 is connected to a second terminal 107 of switch-actuating means 105 and branches to form leads 152 and 153, which are respectively connected to second terminal 119 of coil 117 and lockout terminal 132 of switch 130. Second terminal 104 of switch 102 is connected by lead 154 to ground terminal 142. Lead 155 forms part of a ground circuit to which one side of motor 143 is connected and lead 155 is further connected by a lead 156 to common terminal 133 of captive circuit switch 130.

First terminal 103 of switch 102 is connected by leads 157 and 158 to second terminal 129 of coil 127 and to captive circuit terminal 131 of switch 130. Terminal 103 is also connected through lead 157 and lead 159 to first terminal 112 of switch-actuating means 111. Second terminal 113 of switch-actuating means 111 is connected by lead 160 to lockout terminal 122 of captive circuit switch 120. First terminal 109 of switch 108 is connected by lead 161 to lead 145 (and thereby to input terminal 140). Second terminal 110 of switch 108 is connected by lead 162 to first terminal 128 of coil 127. Second terminal 126 of power control switch 124 is connected by lead 163 to output terminal 141. Second terminal 136 of power control switch 134 is connected by lead 164 to the output terminal. Lead 146 is connected to common terminal 123 of captive circuit switch 120, to first terminal 125 of power control switch 124 and to first terminal 135 of power control switch 134.

The operation of the circuit of FIG. 1 in applying power to a device such as a motor, for a predetermined period of time, will now be described. First, of course, voltage is applied across input terminal 10 and ground terminal 11. The particular device shown is intended to be operated at 28-volts D.C.

Assuming master switch 54a to be closed, the user closes starter switch 51, which passes current from input terminal 10 through lead 56, through the starter switch, through leads 57 and 58, through coil 31 in the first relay means, to lockout terminal 47, and because second relay means 40 is not as yet energized, through captive circuit switch 44, to lead 68 and thence to the ground terminal. This will energize coil 31 in the first relay and will switch the condition of normally open switches 34 and 37 to closed. Thereupon switch 34 becomes a part of a captive circuit which will keep coil 31 energized even though the starter switch has been opened, in the following manner: from input terminal 10 through lead 55, through captive circuit switch 34, to first terminal 32 of the coil, to lockout terminal 47 and through captive circuit switch 44 to lead 68 and ground. This captive circuit will now remain in operation until the ground circuit from coil 31 is broken at the captive circuit switch 44 in the second relay.

In the condition described, and until the ground circuit is broken, current to operate motor 13 is passed from input terminal 10 through lead 55, through power control switch 37, thence through lead 64 to output terminal 11, to which one side of the motor is connected. The other side is permanently connected to ground terminal 12.

Starting the device as above described will also have started current flowing through switch-actuating means 19 of the first delay means in the following manner: from input terminal 10 through lead 55, through captive circuit switch 34 in the first relay, through lead 58, to first terminal 20 of switch-actuating means 19, through switch-actuating means 19, thereby heating it, thence through lead 59 to the lockout terminal 47, through captive circuit switch 44 in the second relay means, through lead 68 to ground. It will be noted that this heating circuit is closed after starter switch 51 has been opened and it will remain in operation so long as relay means 40 is de-energized and relay means 30 is energized.

After the predetermined period of operation of the first delay means elapses, its switch 16 switches over to the actuated condition, that is, closed. This permits current to flow in the following circuit: from lead 64 (which carries current at this time because coil 31 is energized), through lead 65, through coil 41 of the second relay means, thereby energizing the coil and actuating this means, through lead 63, through switch 23 of the second delay means, through lead 61, through switch 16 of the first delay means, through lead 67 to ground terminal 12.

The resulting actuation of second relay means 40 will switch over switches 44 and 48 to their actuated conditions. Captive circuit switch 44 will then interconnect its common terminal and its captive circuit terminal 46 and will disconnect common terminal 45 from lockout terminal 47. This breaks the ground connection from coil 31 in the first relay means, thereby de-energizing the two switches in the first relay and cutting flow of power through the power control switch in that relay. However, simultaneously, power control switch 48 was closed by coil 41, so that current continues without interruption to flow to lead 64 and thence to the output terminal so the motor keeps running.

Breaking the ground connection for coil 31 served to break the captive circuit in the first relay means. Switching over captive circuit switch 44 so that no contact is made with the lockout terminal 47 disables the switch-actuating means 19 in the first delay means because the only path of flow from that portion of the first delay means is through the lockout terminal. Therefore, no matter what is done with the starter switch, there can be no effect on the first delay means so long as the second relay means is actuated. Therefore, the control cycle is rendered independent of what is done with the starter switch once the cycel has begun.

The operation of the first delay means in closing switch 16 is only momentary and is only needed long enough to actuate the coil in the second relay means so that its captive circuit takes over energizing coil 41. The captive circuit may be traced from lead 64 where current exists because of the momentary closure of power control switch 48, through lead 65, coil 41, lead 63, switch 23 in second delay means 22, leads 61 and 60 through captive circuit switch 44 from captive circuit terminal 46 to common terminal 45, through lead 68 to ground terminal 12. This captive circuit will continue to be effective and will hold power control switch 48 closed until opened by operation of the second delay means.

Current is supplied to second delay means 22 from leads 64 and 66 which carry current because of the closure of the power control switch 48. The circuit from switch-actuating means 27 of the second delay means is through leads 62 and 60, thence through captive circuit switch 44 to lead 68 and ground.

After switch-actuating means 27 has been heated sufficiently by virtue of having sufficient current pass therethrough to heat it as required, switch 23 is opened. This breaks the captive circuit through coil 41 and deactuates switches 44 and 48. Switches 44 and 48 revert to their normal conditions, switch 48 cutting off power to lead 64.

All parts of the system are now de-energized, and the circuit will not again begin its operation until the starter switch is pressed, because there is no current path to the first relay means, which is needed to restart the system, except through the starter switch.

The operation of the circuit of FIG. 2 will now be described. Master switch 144 is first closed, and then the circuit is ready for a user, who, to start it, will momentarily close starter switch 147. This will apply current from output terminal 140 through lead 145, switch 147, lead 148, lead 150 to and through coil 117 actuating first relay means 115 through leads 152 and 153 to lockout terminal 132 of switch 130, through switch 130 to lead 156 and thence to ground through lead 155 to terminal 142.

Actuation of relay means 115 will switch the power control switch to a closed position, thereby applying current from the input terminal 140 through lead 146 through power control switch 124 to lead 163 and thence to output terminal 141 to operate the motor, the other side of which is connected to lead 155 and thence to ground.

Concurrently, current is provided to first switch-actuating means 105, initially by current which passed through the starter switch via leads 148 and 149, and, after the starter switch is reopened, through lead 146, captive circuit switch 120 from common terminal 123 to captive circuit terminal 121 through leads 150 and 149 to terminal 106 through means 105 and thence from terminal 107 through leads 151 and 153 to captive circuit switch 130 in the second relay means (which relay means will be in its normal position) through switch 130 from terminal 132 to terminal 133, though leads 156 and 155 to ground 142. This starts the heating of means 105. At the same time, a captive circuit for coil 117 is formed from lead 146 through switch 120 as already described, to terminal 118, through coil 117 to terminal 119, thence through leads 152 and 153, through switch 130 as already described, and thence through leads 156 and 155 to ground.

The above condition continues until first delay means 100 is switched over so as to close switch 102. Closure of switch 102 forms a ground circuit for coil 127 to energize the same in the following circuit: from input terminal 140 through leads 145 and 161, through closed switch 108, through lead 162 through coil 127 and thence through leads 158 and 157 to momentarily closed switch 102 and thence through lead 154 to ground terminal 142. This energizes coil 127 and actuates second relay means 126. This switches over power control switch 134 so that power is applied to motor 143 through a circuit from lead 146 through switch 134 to lead 164 and thence to output terminal 141. At the same time, captive circuit switch 130 is switched over so that it makes a circuit from leads 131 to 133 and breaks the circuit between terminals 132 and 133. Breaking this latter circuit breaks the captive circuit through coil 117 and de-energizes coil 117, returning first relay 115 to its condition as illustrated in FIG. 2.

Actuation of switch 130 makes a captive circuit for coil 127 by providing a ground from terminal 129 through switch 130 to leads 156 and 155 and thence to terminal 142. Thus a ground circuit is maintained to terminal 129 even though switch 102 reopens when current is cut off from switch-actuating means 105. De-actuation of switch 120 also cuts off the flow of current to terminal 106 of actuating means 105 and permits the flow of current from lead 146 through common terminal 123 to lockout terminal 122, thence through lead 160 to second terminal 113 of switch-actuating means 111 to first terminal 112 and thence through leads 159 and 158 to captive circuit terminal 131. Switch 130 is actuated so as to form a circuit between terminals 131 and 133, thereby making a ground circuit for switch-actuating means 111 through leads 156 and 155 to ground terminal 112.

When second delay means 101 are sufficiently heated, switch 108 will be opened, thereby cutting off the source of current to coil 127 and de-actuating the two switches. This de-actuation of switches breaks the circuit between terminals 131 and 133 of captive circuit switch 130, thereby cutting off current flow through switch-actuating means 111. Opening of switch 134 cuts off current to the motor. The device is now in its repose condition as shown in FIG. 2, awaiting the next closing of starter switch 147.

The circuits of FIGS. 1 and 2, while essentially similar, differ in their first relay means. In the circuit of FIG. 2, the first relay means has a double throw switch and a single throw switch instead of two single throw switches. The purpose of this additional switch, and of certain re-routing of the circuitry is to avoid a problem which occasionally arises in the device of FIG. 1. In the device of FIG. 1, if instead of normal usage of actuation spaced apart by at least a major fraction of a minute, for some reason the device is actuated time after time without delay between actuations, both of the delay means 15 and 22 can become superheated.

Under such circumstances, the situation can, and occasionally will, arise wherein both delay means 15 and 22 will be actuated at the time the user closes the starter switch. In such an event, first relay means 30 will be actuated, thereby closing power control switch 37 and operating the motor, while at the same time applying further heat to switch-actuating means 19, thereby tending to keep switch 16 closed. At this time, there will also be a circuit from lead 66, which has current on it from lead 64, through switch-actuating means 27 and lead 62 to first terminal 17 of switch 16, which is closed, and through that switch and lead 67 to ground terminal 12. It will thereby be seen that both delay means 15 and 22 will remain actuated, with the motor in operation, and neither of the delay means can switch over. The only way to shut the control down is to open the master switch 54a and allow the tubes to cool for a moment so that second delay means 22 can cool down again.

The above difficulty is cured in FIG. 2 by the provision of double throw captive circuit switch 120. It will be observed that captive circuit terminal 121 is connected to switch-actuating means 105, and lockout terminal 122 is connected by lead 160 to terminal 113 of switch-actuating means 111. The sole source of current for both of switch-actuating means 105 and 111 (except for the moment that the starter switch 147 is closed) is from current applied at common terminal 123. Therefore, it is not possible for both of the switch-actuator means to have current applied thereto at the same time. Therefore, the circuit of FIG. 2 is an improvement involving a slight addition of additional switching provisions to the circuit of FIG. 1, but both are embodiments of the same invention. Both circuit configurations are of great simplicity and reliability, and also include a minimum number of readily removable and replaceable components. In addition, the period of operation may be appropriately varied by selecting delay means with different time constants, being readily observed that the period of operation of the device is substantially equal to the sum of operating periods of the two relay means.

It has been found that thermal delay devices are at once sufficiently reliable and sufficiently inexpensive to be used in control circuits for many commercial purposes. Even in the circuit of FIG. 1, the conditions where the tubes may become superheated are of rare occurrence. It will be recognized that delay means other than thermal relay tubes may be substituted so long as they have the capacity of opening and closing circuits to flow as a function of periods of current flow therethrough.

This invention is not to be limited to the embodiment shown in the drawing and described in the description which are given by way of example and not of limitation, but only in accordance with the scope of the appended claims.

I claim:

1. A timed-cycle control circuit for controlling the application of power, comprising: an input terminal adapted to be connected to a current source; an output terminal adapted to be connected to a powered device whose period of operation is to be controlled by the control circuit; a common terminal adapted to be connected to both the current source and to the powered device; first delay means; second delay means; each of said delay means including a switch and a switch-actuating means which, when actuated by application of voltage thereto, change the condition of the switch from a normal to an actuated condition, the switch in the first delay means being normally open and the switch in the second delay means being normally closed, their actuated conditions being closed and open, respectively; first and second relay means each including a coil, a captive circuit switch and a power control switch; and a starter switch, the said delay means, relay means, and starter switch being so connected and arranged with each other and with the input, output and common terminals that closure of the starter switch actuates the coil of the first relay to form a captive circuit for its coil, closes its respective power switch to supply current to the output terminal, and applies voltage to the switch-actuating means of the first delay means, whereupon, after a delay, the switch-actuating means of the first delay means completes a circuit through the coil of the second relay, the captive circuit switch of which breaks the captive circuit through the coil of the first relay means and de-actuates the first relay, thereby opening the power control switch of the first relay means and cutting off current to the switch-actuating means of the first delay means, simultaneously closing the power control switch to apply current to the output terminal, completing a captive circuit through the coil of the second relay means, and to apply voltage to the switch-actuating means of the second delay means, whereupon, after a delay, the switch-actuating means of the second delay means actuates its respective switch and opens it to break the respective captive circuit, de-actuate the relay, and open the respective power control switch, thereby cutting off power to the output terminal, and returning the circuit to a repose condition after completion of a cycle, the time length of the cycle of operation of the control circuit being determined by the sum of the times taken by the switch-actuating means of the delay means to actuate their respective switches, and whereby a new cycle cannot be started until a new cycle is completed.

2. A control circuit according to claim 1 in which the switch-actuating means in the delay means are thermal in nature.

3. A control circuit according to claim 1 in which the first and second delay means comprise thermal relays, the switch-actuating means being heater elements adapted to cause the switches to actuate as a function of the time a current is applied.

4. A timed-cycle control circuit for controlling the application of power, comprising: an input terminal adapted to be connected to a current source; an output terminal adapted to be connected to a powered device whose period of operation is to be controlled by the control circuit; a ground terminal adapted to be connected to both the current source and to the powered device; first delay means; second delay means; each of said delay means including a switch and switch-actuating means which, when actuated by application of voltage thereto, changes the condition of the respective switch from a normal to an actuated condition, the switch in the first delay means being normally open and the switch in the second delay means being normally closed, each of said delay means also including first and second switch terminals and first and second switch-actuating means terminals; first relay means including a coil having first and second terminals, a captive control switch, and a power control switch, both of said switches having first and second terminals, and being ganged for simultaneous operation and normally open, actuation of the coil by application of voltage to the coil terminals changing the condition of the switches from their normal condition to an actuated, closed, condition; second relay means including a coil having first and second terminals, a captive circuit switch having a common terminal, a captive circuit terminal, and a lockout terminal, and a power control switch having first and second terminals, the switches being ganged for simultaneous operation, the captive circuit switch normally interconnecting the common and lockout terminals, and the power control switch being normally open, actuation of the coil by application of voltage to the coil terminals changing the condition of the switches from their normal condition to their actuated condition in which the captive circuit switch connects the common and captive circuit terminals, and the power control switch is closed; and a normally open starter switch having first and second terminals; the input terminal being connected to the first terminals of the captive circuit switch and power control switch in the first relay, to the first terminal of the power control switch in the second relay, and to the first terminal of the starter switch; the second terminal of the starter switch being connected to the first terminal of the switch-actuating means of the first delay means, to the first terminal of the coil and the second terminal of the captive circuit switch in the first relay means; the second terminal of the switch-actuating means of the first delay means being connected to the second terminal of the coil in the first relay means and to the lockout terminal in the second relay means; the first terminal of the switch in the first delay means being connected to the first terminal of the switch and the first terminal of the switch-actuating means in the second delay means, and to the captive circuit terminal of the captive circuit switch in the second relay means; the second terminal of the switch in the second delay means being connected to the first terminal of the coil in the second relay means; the second terminal of the switch-actuating means in the second delay means, the second terminal of the coil in the second relay means, and the second terminals of both power control switches all being connected to the output terminal; the second terminal of the switch in the first delay means, and the common terminal of the captive circuit switch in the second relay means both being connected to the return terminal; whereby when input power is applied across the input and ground terminals and the starter switch is momentarily closed, current flow through the coil of the first relay means and the captive circuit switch of the second relay means to the ground terminal, actuates the first relay means and applies power across the output and ground terminals, current also flowing through the switch-actuating means of the first delay means until the switch thereof is moved to its actuated condition, whereupon the coil of the second relay means is actuated to switch its respective switches to their actuated condition and de-energize the coil of the first relay by breaking its circuit to ground through the lockout terminal, and simultaneously transmitting power across the output terminal and ground terminal until the switch-actuating means of the second delay means actuates its respective switch to de-energize the coil of the second relay by opening its circuit to ground through said switch, whereby the time length of the cycle of operation of the control circuit is determined by the sum of the times taken by the switch-actuating means of the delay means to actuate their respective swiches, and whereby a new cycle cannot be started until the previous cycle is completed.

5. A control circuit according to claim 4 in which the switch-actuating means in the delay means are thermal in nature.

6. A control circuit according to claim 4 in which the first and second delay means comprise thermal relays, the switch-actuating means being heater elements adapted to cause the switches to actuate as a function of the time a current is applied.

7. A timed-cycle control circuit for controlling the application of power, comprising: an input terminal adapted to be connected to a current source; an output terminal adapted to be connected to a powered device whose period of operation is to be controlled by the control circuit; a ground terminal adapted to be connected to both the current source and to the powered device; first delay means; second delay means; each of said delay means including a switch and a switch-actuating means which, when actuated by application of voltage thereto, changes the condition of the respective switch from a normal to an actuated condition, the switch in the first delay means being normally open and the switch in the second delay means being normally closed, each of said delay means also including first and second switch terminals and first and second switch-actuating means terminals; first and second relay means, each including a coil having first and second terminals, a captive control switch having a common terminal, a captive circuit terminal, and a lockout terminal, and a power control switch having first and second terminals, the switches of each respective relay means being ganged for simultaneous operation, the captive circuit switches normally interconnecting the common and lockout terminals, and the power control switches being normally open, actuation of the coils by application of voltage to the coil terminals serving to change the condition of the switches from their normal condition to their actuated condition in which the captive circuit switch connects the common and captive circuit terminals and the power control switch is closed; and a normally open starter switch having first and second terminals, the input terminal being connected to the first terminal of the starter switch, to the common terminal of the captive circuit switch, and to the first terminal of the power control switch in the first relay means, and to the first terminal of the power control switch in the second relay means; the second terminal of the starter switch being connected to the first terminal of the switch-actuating means in the first delay means, and to the first terminal of the coil, and to the captive circuit terminal of the captive circuit switch in the first relay means; the second terminal of the switch-actuating means in the first delay means being connected to the second terminal of the coil in the first relay means and to the lockout terminal of the captive circuit switch in the second relay means; the first terminal of the switch in the first delay means being connected to the first terminal of the switch-actuating means in the second delay means, and to the second terminal of the coil, and to the captive circuit terminal in the second relay means; the first terminal of the switch in the second delay means being connected to the input terminal; the second terminal of the switch in the second delay means being connected to the first terminal of the coil in the second relay means; the second terminal of the switch in the first delay means, and the ground terminal of the captive circuit switch in the second relay means both being connected to the ground terminal; the second terminal of the switch-actuating means of the second delay means being connected to the lockout terminal of the captive circuit switch in the second relay; and the second terminals of both power switches being connected to the output terminal; whereby when input power is applied across the input and ground terminals and the starter switch is momentarily closed, current flow through the coil of the first relay means and the captive circuit switch of the second relay means to the ground terminal actuates the first relay means and applies power across the output and ground terminals, current also flowing through the switch-actuating means of the first delay means until the switch thereof is moved to its actuated condition, whereupon the coil of the second relay means is actuated to switch its respective switches to their actuated condition and de-energize the coil of the first relay by breaking its circuit to ground through the lockout terminal, and simultaneously transmitting power across the output terminal and ground terminal until the switch-actuating means of the second delay means actuates its respective switch to de-energize the coil of the second relay by opening its circuit to ground through said switch, whereby the time length of the cycle of operation of the control circuit is determined by the sum of the times taken by the switch-actuating means of the delay means to actuate their respective switches, and whereby a new cycle cannot be started until the previous cycle is completed.

8. A control circuit according to claim 7 in which the switch-actuating means in the delay means are thermal in nature.

9. A control circuit according to claim 7 in which the first and second delay means comprise thermal relays, the switch-actuating means being heater elements adapted to cause the switches to actuate as a function of the time a current is applied.

References Cited in the file of this patent

UNITED STATES PATENTS

| | | |
|---|---|---|
| 2,057,384 | Lamb | Oct. 13, 1936 |
| 2,433,254 | Aiken | Dec. 23, 1947 |
| 2,738,448 | Bokser | Mar. 13, 1956 |
| 2,765,430 | Graef | Oct. 2, 1956 |
| 2,989,667 | Swink | June 20, 1961 |